(12) United States Patent
Nowakowski et al.

(10) Patent No.: US 11,421,603 B2
(45) Date of Patent: Aug. 23, 2022

(54) TURBOJET WITH STEP-DOWN MECHANISM

(71) Applicant: SAFRAN AIRCRAFT ENGINES, Paris (FR)

(72) Inventors: Nathalie Nowakowski, Moissy-Cramayel (FR); Gilles Alain Marie Charier, Moissy-Cramayel (FR); Kévin Morgane Lemarchand, Moissy-Cramayel (FR); Nicolas Jérôme Jean Tantot, Moissy-Cramayel (FR); Jonathan Evert Vlastuin, Moissy-Cramayel (FR); Henri Yesilcimen, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/278,149

(22) PCT Filed: Sep. 20, 2019

(86) PCT No.: PCT/FR2019/052212
§ 371 (c)(1),
(2) Date: Mar. 19, 2021

(87) PCT Pub. No.: WO2020/058653
PCT Pub. Date: Mar. 26, 2020

(65) Prior Publication Data
US 2021/0348566 A1   Nov. 11, 2021

(30) Foreign Application Priority Data
Sep. 21, 2018  (FR) ...................... 1858584

(51) Int. Cl.
*F02C 7/36* (2006.01)
*F02C 7/06* (2006.01)
*F02K 3/06* (2006.01)

(52) U.S. Cl.
CPC .................. *F02C 7/36* (2013.01); *F02C 7/06* (2013.01); *F02K 3/06* (2013.01);
(Continued)

(58) Field of Classification Search
CPC ....................................................... F02C 3/107
See application file for complete search history.

(56) References Cited

U.S. PATENT DOCUMENTS

| 7,882,693 B2 | 2/2011 | Schilling |
| 2004/0255590 A1 | 12/2004 | Rago et al. |
| 2010/0126178 A1 | 5/2010 | Hyde et al. |

(Continued)

FOREIGN PATENT DOCUMENTS

| EP | 1936238 A2 | 6/2008 |
| EP | 3330515 A1 | 6/2018 |

(Continued)

OTHER PUBLICATIONS

International Search Report issued in International Patent Application No. PCT/FR2019/052212, dated Dec. 17, 2019 (2 pages).

(Continued)

*Primary Examiner* — Ehud Gartenberg
*Assistant Examiner* — David P. Olynick
(74) *Attorney, Agent, or Firm* — Bookoff McAndrews, PLLC (57) ABSTRACT

Turbojet engine includes a fan, a compressor, a combustion chamber, and a turbine configured to rotatably drive the fan via a first reduction gear and the compressor via a second reduction gear, in which an outlet of the first reduction gear is rotatably coupled to an inlet of the second reduction gear by a reduction shaft, the reduction shaft being supported by a bearing arranged between the first reduction gear and the second reduction gear.

11 Claims, 2 Drawing Sheets

(52) U.S. Cl.
CPC .... *F05D 2220/323* (2013.01); *F05D 2220/36* (2013.01); *F05D 2240/54* (2013.01); *F05D 2240/60* (2013.01); *F05D 2260/4031* (2013.01)

(56) References Cited

U.S. PATENT DOCUMENTS

| | | |
|---|---|---|
| 2013/0259652 A1 | 10/2013 | Kupratis et al. |
| 2014/0290265 A1 | 10/2014 | Ullyott et al. |
| 2016/0102607 A1* | 4/2016 | Hiernaux ............... F02C 3/067 |
| | | 415/69 |
| 2016/0131028 A1 | 5/2016 | Lauer et al. |
| 2020/0191062 A1* | 6/2020 | Sheridan ............... F02C 3/107 |

FOREIGN PATENT DOCUMENTS

| | | |
|---|---|---|
| FR | 2360758 A1 | 3/1978 |
| WO | WO 2015/031143 A1 | 3/2015 |

OTHER PUBLICATIONS

International Civil Aviation Organization, "Manual of the ICAO Standard Atmosphere," Doc. 7488/3, 3rd edition, 1993 (14 pages).
French Search Report in FR 1858584, dated May 14, 2019 (2 pages).
French Search Report in FR Application No. 1858588, dated May 10, 2019 (2 pages).
International Search Report issued in International Application No. PCT/FR2019/052211, dated Jan. 16, 2020 (3 pages).
Mark Daly et al., "Aero-Engines," Jane's, Mar. 1, 2008, pp. 706-712 (5 pages).

\* cited by examiner

FIG.5

TURBOJET WITH STEP-DOWN MECHANISM

CROSS-REFERENCE TO RELATED APPLICATION(S)

This application is the U.S. national phase entry under 35 U.S.C. § 371 of International Application No. PCT/FR2019/052212, filed on Sep. 20, 2019, which claims priority to French Patent Application No. 1858584, filed on Sep. 21, 2018.

TECHNICAL FIELD

The present disclosure concerns the field of aircrafts, and more particularly a turbojet engine that may be used for the aeronautical propulsion.

TECHNOLOGICAL BACKGROUND

In recent years, aircraft engines have experienced many improvements which have allowed increasing their performances and significantly reducing their fuel consumption and their greenhouse gas emissions. Currently, the efforts required to obtain similar gains in the years to come are proportionally much higher. This implies greatly increased costs but also an increasing complexity of the systems implemented, with the result that the operability of the engines and their performance/cost ratio could deteriorate.

There is therefore a need for a new type of aircraft engine, particularly a turbojet engine, which forms a more acceptable compromise between different parameters such as the specific consumption, the drag, the geometry, the mass, the simplicity and the costs.

GENERAL PRESENTATION

To this end, the present disclosure concerns a turbojet engine comprising a fan, a compressor, a combustion chamber and a turbine configured to rotatably drive the fan via a first reduction gear and the compressor via a second reduction gear, wherein an outlet of the first reduction gear is rotatably coupled to an inlet of the second reduction gear by a reduction shaft, the reduction shaft being supported by a bearing arranged between the first reduction gear and the second reduction gear.

In the present disclosure, "axis of the turbojet engine" refers to its axis of symmetry or quasi-symmetry, which forms the axis of rotation of the compressor and of the turbine. The axial direction corresponds to the direction of the axis of the turbojet engine and a radial direction is a direction perpendicular to this axis and intersecting this axis. Likewise, an axial plane is a plane containing the axis of the turbojet engine and a radial plane is a plane perpendicular to this axis. A circumference is understood as a circle belonging to a radial plane and whose center belongs to the axis of the turbojet engine. A tangential or circumferential direction is a direction tangent to a circumference; it is perpendicular to the axis of the turbojet engine but does not pass through the axis.

Unless otherwise specified, the adjectives "front" and "rear" are used with reference to the axial direction on the understanding that the inlet of the turbojet engine is located on the front side of the turbojet engine, while its outlet is located on the rear side. The adjectives "upstream" and "downstream" are used with reference to the normal direction of flow of the gases in the turbojet engine.

Finally, unless otherwise specified, the adjectives "internal (inner)" and "external (outer)" are used with reference to a radial direction so that the internal part of an element is, along a radial direction, closer to the axis of the turbojet engine than the external part of the same element.

Thus, it is understood that the aforementioned bearing can be arranged axially between the first reduction gear and the second reduction gear. The bearing may be supported relative to a fixed casing of the turbojet engine, in particular fixed relative to the combustion chamber.

A reduction gear is a device that allows changing the speed ratio or/and the torque between at least one input wheel and at least one output wheel. Within the meaning of the present disclosure, a reduction gear may have a transmission ratio less than one, but also greater than one, depending on what is considered to be the inlet or the outlet (a reduction gear is a generally reversible transmission), in which case there is sometimes reference to "multiplier". As indicated, an outlet of the first reduction gear is rotatably coupled to an inlet of the second reduction gear by a reduction shaft, that is to say, there is a functional connection between the outlet of the first reduction gear and the inlet of the second reduction gear.

Unlike the current developments which are based for the most part, if not entirely, on turbojet engines without a reduction gear, the present disclosure proposes to implement a turbojet engine with at least one reduction gear, in this case at least two reduction gears. The architecture thus proposed allows greatly simplifying the turbojet engine, for example through the elimination of complex members such as shafts, bearings and supports, and reducing its mass and its cost.

In addition, thanks to the fact that the reduction shaft is supported by a bearing arranged between the first reduction gear and the second reduction gear, the turbojet engine has a good dynamic situation, that is to say, good mechanical and aerodynamic behavior in operating mode, and main vibratory natural modes, that is to say, damaging to the turbojet engine, that are out of the operating mode. In addition, said bearing allows securely holding the first reduction gear and the second reduction gear, avoiding or limiting the dynamic couplings between these two reduction gears. As a consequence, the turbojet engine has a performance level comparable to that of the turbojet engines also existing, or has a much better performance/cost ratio than an existing turbojet engine.

In some embodiments, the bearing is a roller bearing. Said bearing therefore allows axial movement of the reduction shaft.

In some embodiments, the turbojet engine is a turbofan engine comprising a casing disposed downstream of the fan and separating a primary flowpath from a secondary flowpath, and the bearing is supported by said casing.

The turbojet engine is called turbofan engine in that it comprises a primary flowpath accommodating a primary stream and a secondary flowpath accommodating a secondary stream. The casing separating the primary flowpath and the secondary flowpath is sometimes called inner casing. Thanks to the fact that the bearing is supported by the inner casing, the bearing support structure can be simplified, which limits the increase of the mass of the turbojet engine, simplifies its general structure and improves its performances.

In some embodiments, said bearing is arranged radially outside the compressor shaft, the turbine shaft and the reduction shaft. This allows further optimizing the dynamic situation of the turbojet engine.

In some embodiments, the reduction shaft is a planet carrier common to the first reduction gear and to the second reduction gear.

In addition to the characteristics which have just been mentioned, the proposed turbojet engine may comprise one or more other bearings according to the characteristics among the following, considered in isolation or according to the technically possible combinations:

- a fan bearing arranged between the shaft of the fan and the casing. The fan bearing supports the fan shaft relative to the casing;
- a compressor bearing arranged between the compressor shaft and the casing. The compressor bearing, also called first compressor bearing, supports the compressor shaft relative to the casing;
- a second bearing, such as a roller bearing, arranged to support the reduction shaft. Using two roller bearings to support the reduction shaft prevents hyperstatism;
- an inter-shaft bearing, for example a roller bearing, arranged between the compressor shaft and the turbine shaft. The inter-shaft bearing may be arranged radially between the compressor shaft and the turbine shaft and support these two shafts relative to each other;
- a compressor bearing arranged between the compressor shaft and a structural member downstream of the compressor, wherein said structural member can, for example, be the casing of the combustion chamber or the diffuser located between the compressor and the combustion chamber. The compressor bearing, also called second compressor bearing, supports the compressor shaft relative to the structural member.

The present disclosure also concerns a single-spool turbofan engine, comprising a fan, a casing disposed downstream of the fan and separating a primary flowpath from a secondary flowpath, a compressor, a combustion chamber and a turbine being arranged in the primary flowpath, the turbojet engine comprising a differential transmission coupled to the turbine, wherein the by-pass ratio between the secondary flowpath and the primary flowpath is greater than or equal to 12.

As indicated, the differential transmission is coupled to the turbine, that is to say, there is a functional, possibly permanent, connection between the turbine and the differential transmission. The differential transmission may be configured to drive the fan and/or the compressor, thanks to mechanical energy provided by the turbine. The differential transmission is a power transmission that allows modifying the speed ratio and/or the torque between at least one inlet, in this case the turbine, and at least one outlet, in this case the fan and/or the compressor. Within the meaning of the present disclosure, the differential transmission may have a transmission ratio less than one, in which case there is sometimes reference to "reduction system", but also greater than one, depending on what is considered to be the inlet or the outlet, in which case there is sometimes reference to "multiplier system". The differential transmission may be electromechanical or purely mechanical.

The turbojet engine may be a single-spool engine. A single-spool engine comprises a single rotating assembly, connecting one or more compressors to one or more turbines via a common kinematics, which does not mean that all the components rotate at the same speed but that their rotations are linked. In contrast, a two-spool engine comprises two kinematically independent rotating assemblies, each of these assemblies connecting its own compressors and turbines via its own kinematics and independent of that of the other assembly. In the following, for the sake of brevity but without loss of generality, it will be assumed that the single-spool comprises one compressor and one turbine.

The by-pass ratio between the secondary flowpath and the primary flowpath, more simply called by-pass ratio (BPR), is the ratio of the air flow rate entering the secondary flowpath to the air flow rate entering the primary flowpath. Increasing the BPR allows increasing the performance of the turbojet engine, insofar as the thrust is essentially provided by the air stirred by the fan and which passes through the secondary flowpath. For example, a by-pass ratio greater than or equal to 12 may be obtained within the context of a subsonic ejection speed at the outlet of the turbojet engine, preferably between Mach 0.8 and Mach 1 at the throat of the ejection nozzle, for a corresponding aircraft speed comprised between Mach 0.7 and Mach 0.9.

Increasing the BPR however requires increasing the diameter of the fan, which collectively leads to increasing the section of the secondary flowpath.

As indicated above, the turbojet engine comprises a differential transmission formed of the first reduction gear configured to modify the rotational speed transmission ratio between the turbine and the fan and of the second reduction gear configured to modify the rotational speed transmission ratio between the turbine and the compressor.

Thus, the rotation of the fan can be decoupled from the rotation of the compressor, which allows having, for these two components, different rotational speeds. This allows maintaining the rotational speed of the compressor at a certain level while decreasing the rotational speed of the fan. However, the rotational speed of the fan determines the tangential speed of the radially outer part of the fan blades, also called blade tip. The speed of the blade tip must comply with some constraints, in particular remain subsonic, for example less than or equal to 310 meters per second (m/s). As a consequence, being able to decrease the rotational speed of the fan allows, at the same blade tip speed, increasing the diameter of the fan. This results in even better performances for the turbojet engine.

In some embodiments, the first reduction gear is a differential reduction gear having an input wheel rotatably secured to the turbine, a first output wheel rotatably secured to the fan, a second output wheel rotatably secured to an input wheel of the second reduction gear, and the second reduction gear is an epicyclic reduction gear having an output wheel rotatably secured to the compressor.

A differential reduction gear may combine the rotation of three wheels, for example one input wheel and two output wheels, or two input wheels and one output wheel. An epicyclic reduction gear may combine the rotation of two wheels, for example an input wheel and an output wheel.

The differential reduction gear and/or the epicyclic reduction gear may be provided in the form of an epicyclic gear train. An epicyclic gear train generally has an external planetary gear, also called ring gear, as well as an internal planetary gear, also called planetary gear or sun gear. The sun gear and the ring gear are coupled through one or more planet gears, the planet gears being coupled together by a planet carrier. Within the meaning of the present disclosure, "wheel" generically refers to any one of the ring gear, of the planet carrier or of the sun gear. Each wheel can be used as an inlet or outlet of a mechanical transmission.

In this case, the rotation of the turbine is transmitted, via the first reduction gear, to the fan. This results in a first transmission ratio, for example a first torque ratio, between the turbine and the fan. The second output wheel of the first reduction gear drives an input wheel of the second reduction gear whose outlet drives the compressor. This results in a second transmission ratio between the turbine and the compressor. Thus, the use of a differential reduction gear allows decoupling the rotation of the fan and of the compressor. To limit the complexity of the turbojet engine, the epicyclic reduction gear can be coupled to the differential reduction gear and not directly to the turbine.

In some embodiments, the ratio of the number of teeth of the first output wheel of the first reduction gear to the number of teeth of the input wheel of the first reduction gear is greater than 1. This ratio may be greater than 1.2, more preferably still greater than 1.4. In addition, this ratio may be less than 1.8, more preferably less than 1.6. This ratio may be approximately equal to 1.5. In case of nominal operation, the first reduction gear is therefore configured to provide the fan with a lower rotational speed than the one provided to the compressor.

In some embodiments, the ratio of the number of teeth of the ring gear of the second reduction gear to the number of teeth of the output wheel of the second reduction gear is greater than 2. In the case of an epicyclic gear train, the ring gear of the second reduction gear may be fixed relative to the inner casing of the turbojet engine. This ratio allows increasing the rotational speed of the compressor relative to the speed provided at the inlet of the second reduction gear by the first reduction gear. This ratio may be greater than 5, more preferably greater than 6. In addition, this ratio may be less than 9, more preferably less than 8. This ratio may be approximately equal to 7.

In some embodiments, the ratio of the number of teeth of the first output wheel of the first reduction gear to the number of teeth of the input wheel of the first reduction gear is smaller than the ratio of the number of teeth of the ring gear of the second reduction gear to the number of teeth of the output wheel of the second reduction gear. It is the ratio of the two aforementioned ratios; it is indeed verified on the given examples that 1.5 is less than 7. In this configuration, the diameter of the different wheels of the differential transmission can be reduced and the overall cost of production of the differential transmission can be limited.

In some embodiments, the second reduction gear has a transmission ratio greater than 3. The transmission ratio is the ratio of the rotational speed of the output wheel to the rotational speed of the input wheel. In the case of planet gears, the rotational speed of the planet carrier is considered, which corresponds to the speed of revolution of the planet gears around the sun gear and not the rotational speed of the planet gears on themselves.

This transmission ratio may be greater than 6, more preferably greater than 7. In addition, this ratio may be less than 10, more preferably less than 9. This ratio may be approximately equal to 8.

In some embodiments, the compression ratio of the fan at cruising speed is comprised between 1.3 and 1.45. According to the usual definition, "compression ratio of the fan" refers to the ratio of the volume-averaged total pressure of a given mass of air at the inlet of the fan to the volume-averaged total pressure of this same mass of air at the outlet of the fan. A relatively low compression ratio allows increasing the performances of the turbojet engine.

In some embodiments, the compression ratio of the compressor is greater than or equal to 25 at a rotational speed of the compressor of 15,500 rpm. Such a compression ratio is adapted to the aerodynamics of the compressor and of the turbine. For example, the compressor may comprise at least eight stages of blades, preferably at least nine or ten stages.

In some embodiments, the overall pressure ratio is greater than or equal to 30 at top of climb. The overall pressure ratio or OPR is the ratio of the total pressure of the air at the outlet of the compressor to the total pressure of the air at the inlet of the fan. The point called "top of climb" is the point at which the ascent to the cruising altitude is completed, this point being conventionally calculated so that the ascent is as economical and short as possible. A high OPR allows improving the thermal efficiency, and therefore the performances of the gas generator of the turbojet engine. An OPR comprised between 30 and 40 may seem less advantageous than on two-spool engines, but this is compensated by a significant gain in terms of simplicity, operability and cost.

Furthermore, unless otherwise indicated, the values of the quantities mentioned in the present disclosure are measured when the turbojet engine is stationary in a standard atmosphere, as defined by the manual of the International Civil Aviation Organization (ICAO), Doc 7488/3, $3^{rd}$ edition, and at sea level.

The present disclosure also concerns a turbofan engine, comprising a fan, a casing disposed downstream of the fan and separating a primary flowpath from a secondary flowpath, a compressor, a combustion chamber and a turbine being arranged in the primary flowpath, the turbofan engine comprising a differential transmission coupled to the turbine, and a power supply device configured to provide additional power to that provided by the turbine to drive the compressor.

Thanks to the fact that the turbojet engine comprises a power supply device configured to provide additional power to that provided by the turbine to drive the compressor, it is possible, depending on the speed, to operate the compressor in a desired operating range while the turbine alone, in the considered speed, in particular at low speed, would not allow operation in this range. Therefore, the performances of the turbojet engine are further improved, regardless of the operating speed of the turbojet engine.

In some embodiments, the turbojet engine further comprises a control unit configured to control the power supply device based on a rotational speed of the turbine. Thus, the power supply device may be controlled based on the speed of the turbojet engine. This allows finely adapting the parameters of the turbojet engine and optimizing the operation of the turbojet engine.

In some embodiments, the power supply device comprises an electric motor configured to rotatably drive the compressor. In these embodiments, the power supply device can be controlled very flexibly, depending on the power requirements, in particular continuously over a range covering the zero power up to the maximum power of dimensioning of the power supply device.

In some embodiments, the power supply device comprises an electric generator configured to be driven by the turbine. The electric generator may be configured to power the aforementioned electric motor, directly or via electricity storage means.

Indeed, in some embodiments, the turbojet engine comprises electricity storage means electrically connected to the electric motor or to the electric generator. Thus, during some flight phases, for example at high speed, the turbine may drive the electric generator so that the excess mechanical power is stored, in electrical form, in the electricity storage means. During other flight phases, for example at low speed, the compressor may be driven by the turbine and by the electric motor, the electric motor drawing its energy from the electricity storage means. However, other variations are possible. For example, instead of being recharged by an electric generator driven by the turbine, the electricity storage means could be recharged using a power supply external to the turbojet engine.

Thus, in some embodiments, the power supply device comprises a connector configured to be connected to an outer power supply.

In some embodiments, the power supply device comprises a variable mechanical transmission coupled on the one hand to the shaft of the compressor and on the other hand to the shaft of the turbine. Thus, the variable mechanical transmission allows extracting from the turbine a power to drive the compressor, said power being able to be regulated, for example based on the speed of the turbojet engine. The variable mechanical transmission may be connected or disconnected from the compressor and/or the turbine. The variable mechanical transmission may transmit a fixed or variable proportion of the power of the turbine to the compressor. The variable mechanical transmission may comprise any one of the following elements: a clutch, a gearbox, a variator, etc.

In some embodiments, the power supply device comprises an electromagnetic transmission coupled on the one hand to the shaft of the compressor and on the other hand to the shaft of the turbine. The electromagnetic transmission may be, for example, a magnetic gear transmission. An electromagnetic transmission has many advantages, in particular the absence of mechanical fatigue, of lubrication, of losses due to mechanical contacts, of noise, as well as a very high efficiency.

In some embodiments, the maximum additional power provided by the power supply device is greater than 1.5 megawatts (MW). Such a maximum additional power is useful to compensate for the power not provided by the turbine during certain speeds of the turbojet engine.

In some embodiments, the power supply device is configured to be deactivated when the rotational speed of the turbine is greater than 95% of the maximum rated rotational speed of the turbine. Thus, it is possible to dimension the power supply device only for an operation at moderate mechanical speeds where its role is useful, thus minimizing its mass and complexity. For example, the power supply device may be configured to be deactivated when the rotational speed of the turbine is sufficient to drive the compressor by itself at a reduced speed of at least 50% of the rated speed, preferably at least 70%. Conversely, the power supply device may be configured to be activated when the rotational speed of the turbine is insufficient to drive the compressor by itself at a reduced speed of at least 50% of the rated speed, preferably at least 70%.

BRIEF DESCRIPTION OF THE DRAWINGS

The invention and its advantages will be better understood upon reading the following detailed description of embodiments given by way of non-limiting examples. This description refers to the appended drawings, in which.

DETAILED DESCRIPTION OF EMBODIMENTS

Figure 1:
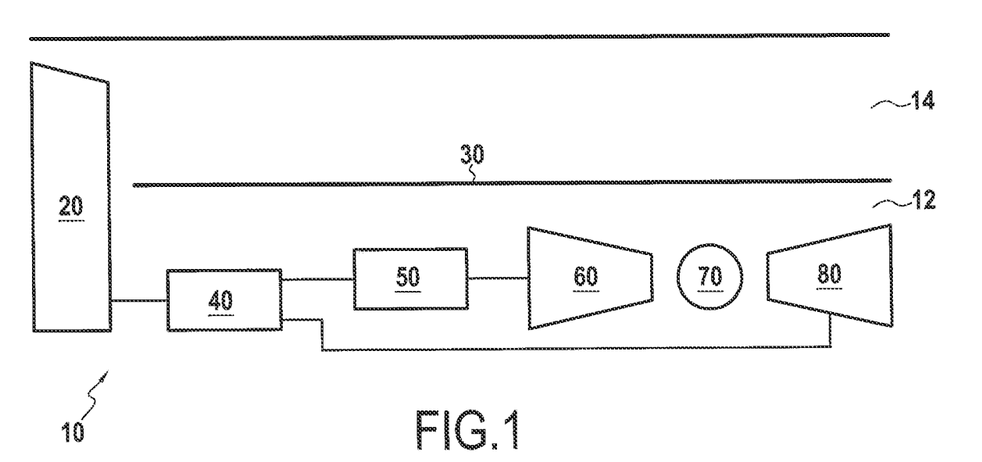
FIG. 1 is a schematic representation of a turbojet engine according to one embodiment.

A turbojet engine 10 according to one embodiment is schematically represented in FIG. 1. In this case, the turbojet engine 10 is a single-spool turbofan engine. Indeed, the turbojet engine 10 comprises a fan 20, an inner casing 30 disposed downstream of the fan 20 and separating a primary flowpath 12 from a secondary flowpath 14. A compressor 60, a combustion chamber 70 and a turbine 80 are arranged in the primary flowpath 12, from upstream to downstream. Due to the fact that the turbojet engine 10 is a single-spool engine, it includes a single rotating assembly comprising the compressor 60 and the turbine 80. In this case, the turbojet engine comprises a single compressor 60 driven directly or indirectly by a single turbine 80, the turbine 80 being set in motion by the combustion gases derived from the combustion chamber 70.

The fan 20 may comprise a blade wheel. The fan 20 may be dimensioned so that its compression ratio at cruising speed is comprised between 1.3 and 1.45, at a rotational speed of about 2,600 rpm. The diameter of the fan 20 may be comprised between 2 and 2.7 meters, more specifically between 2.2 meters and 2.4 meters. It will be understood here by "diameter of the fan 20" the radial distance between the axis of the turbojet engine 10 and the fan blade tip.

The compressor 60 may comprise between five and fifteen stages, in particular between eight and twelve stages, preferably about ten stages, each stage being formed of a vane wheel and a blade wheel. It should be recalled that the blades of the stages of the same compressor are rotatably secured about the axis of the compressor. The compressor may be dimensioned so that its compression ratio is greater than or equal to twenty-five at a rotational speed of approximately 15,500 rpm, which may correspond to the cruising speed.

Thus, in this embodiment, the OPR of the turbojet engine 10 may be greater than or equal to thirty.

The turbine 80 may comprise between two and six stages, in particular between three and five stages, preferably about four stages. It is recalled that the blades of the stages of the same turbine are rotatably secured about the axis of the turbine. The turbine may be provided to rotate at approximately 8,600 rpm at cruising speed.

In this embodiment, the turbine 80 rotatably drives the compressor 60. The turbine 80 also rotatably drives the fan 20. More specifically, the turbojet engine 10 comprises a differential transmission coupled to the turbine 80. In this case, as illustrated in FIG. 1, the differential transmission is coupled to the fan 20 and to the compressor 60 and comprises, here, a first reduction gear 40 configured to modify the rotational speed transmission ratio between the turbine 80 and the fan 20, and a second reduction gear 50 configured to modify the rotational speed transmission ratio between the turbine 80 and the compressor 60.

In this embodiment, the by-pass ratio between the secondary flowpath 14 and the primary flowpath 12, also called BPR, is greater than or equal to twelve, preferably greater than or equal to fourteen, or even 14.5. In this embodiment, such a BPR may be achieved thanks to the diameter of the fan, to the compression ratio of the fan and to the number of stages of the turbine 80. However, other parameters could be involved: for example, a high BPR may also be achieved by the joint increase of the OPR and of the inlet temperature of the turbine, this conjunction contributing to reducing the mass flow rate of the primary flowpath, therefore increasing the BPR.

As indicated above, in the turbojet engine 10, the rotational speed of the fan 20 can be decoupled from that of the compressor 60. For example, the ratio of the rotational speed of the compressor 60 to the rotational speed of the fan 20 may be comprised between 5.5 and 6.5 at full power points. In addition, unlike a single differential reduction gear, the use of two reduction gears allows alleviating the mechanical and aerodynamic stresses on the turbine 80.

FIGS. 2 to 5 present the turbojet engine 10 in other embodiments. In these figures, the elements corresponding or identical to those of the first embodiment will receive the same reference sign and will not be described again.

Figure 2:
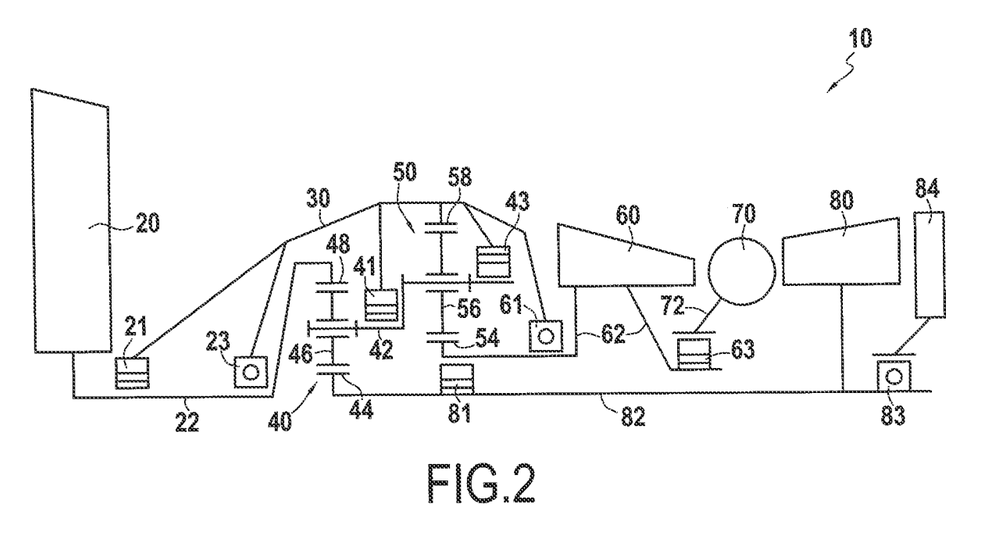
FIG. 2 schematically illustrates an axial half-section of a turbojet engine according to a second embodiment.

FIG. 2 illustrates in more detail the structure of the turbojet engine 10.

It will be noted firstly that due to the presence of the differential transmission, the fan shaft 22, the compressor shaft 62 and the turbine shaft 82 are separate from each other.

As represented in FIG. 2, the first reduction gear 40 is a differential reduction gear having an input wheel 44, in this case a sun gear (also called sun gear 44), rotatably secured to the turbine 80, here via a turbine shaft 82, and a first output wheel 48, in this case a ring gear (also called ring gear 48), rotatably secured to the fan 20, here via a fan shaft 22. Preferably, the ratio R1 of the number of teeth of the first output wheel 48 to the number of teeth of the input wheel 44 is greater than 1 and is, in this embodiment, approximately equal to 1.5.

The sun gear 44 and the ring gear 48 are engaged by means of planet gears 46. One or more planet gears 46 may be provided. Within the meaning of the present disclosure, the expression "engaged" expresses an inter-engagement of two elements, whether this engagement be mechanical, electromagnetic or of another nature. The planet carrier 42 connected to the planet gear(s) 46 forms the second output wheel of the first reduction gear 40.

Furthermore, the second reduction gear 50 is an epicyclic reduction gear. As indicated above, the second reduction gear 50 has an input wheel rotatably secured to the second output wheel 42 of the first reduction gear 40. In this case, as illustrated in FIG. 2, the planet carrier 42 forms both the second output wheel of the first reduction gear 40 and the input wheel of the second reduction gear 50. As a consequence, the planet carrier 42 also forms a reduction shaft between the first reduction gear 40 and the second reduction gear 50. As a consequence, in this embodiment, the following terms will be used interchangeably: planet carrier 42, reduction shaft, second output wheel of the first reduction gear 40, input wheel of the second reduction gear 50. However, in general, these members may be separate from each other, in which case an outlet of the first reduction gear 40 is rotatably coupled to an inlet of the second reduction gear 50 by a reduction shaft 42.

The transmission shaft 42 is a planet carrier for the first reduction gear 40 and, independently, is also a planet carrier for the second reduction gear 50. Thus, the second reduction gear 50 comprises one or more planet gears 56 the rotation of which is caused by the rotation of the planet carrier 42.

The second reduction gear 50 comprises, in addition to its input wheel 42, an output wheel 54, in this case a sun gear (also called sun gear 54), rotatably secured to the compressor 60, here via a compressor shaft 62. In this embodiment, the sun gear 54 is engaged with the planet gears 56. The planet gears 56 may furthermore be engaged with a ring gear 58, here fixed relative to the casing 30.

Preferably, the ratio R2 of the number of teeth of the ring gear 58 of the second reduction gear 50 to the number of teeth of a planet gear 56 is greater than 2 and is, in this embodiment, approximately equal to 7.

Furthermore, in this embodiment, the aforementioned ratio R1 is smaller than the ratio R2.

The second reduction gear may be dimensioned to have a transmission ratio greater than 3, for example approximately equal to 8.

As can be seen from FIG. 2, the first and second reduction gears 40, 50, are coaxial.

Bearings may be provided to support the aforementioned shafts. In particular, the reduction shaft 42 may be supported by a bearing 41 arranged between the first reduction gear 40 and the second reduction gear 50, so as to improve the dynamic situation of the differential transmission. More specifically, as illustrated in FIG. 2, the bearing 41, in this case a roller bearing, is arranged axially between the first reduction gear 40 and the second reduction gear 50, and radially between the reduction shaft 42 and the casing 30, to support the reduction shaft 42 relative to the casing 30.

If necessary, the reduction shaft 42 may be supported by a second bearing 43. The second bearing 43 may be provided at the front of the first reduction gear 40 or, as represented in FIG. 2, at the rear of the second reduction gear 50. The second bearing 43 may be a roller bearing. The second bearing 43 may be arranged radially between the reduction shaft 42 and the casing 30. The second bearing 43 may support the reduction shaft 42 relative to the casing 30.

Furthermore, the fan shaft 22, the compressor shaft 62 and the turbine shaft 82 may each, independently of each other, be supported by at least one bearing or, in this embodiment, at least two bearings.

According to one example, the fan shaft 22 is supported relative to the casing 30 by a front fan bearing 21 and a rear fan bearing 23. Furthermore, according to one example, the compressor shaft 62 is supported by a front compressor bearing 61 relative to the casing 30, and by a rear compressor bearing 63 relative to a structural member 72 downstream of the compressor, here a combustion chamber casing. Furthermore, according to one example, the turbine shaft 82 is supported by a rear turbine bearing 83 relative to an exhaust casing 84, also known as a "turbine rear frame" (TRF).

Furthermore, the compressor shaft 62 may be coaxial with the turbine shaft 82 and fitted externally on the turbine shaft 62. In this perspective, there may be provided an inter-shaft bearing 81 arranged between the compressor shaft 62 and the turbine shaft 82, particularly radially between these two shafts. The inter-shaft bearing 81 supports the compressor shaft 62 relative to the turbine shaft 82 and allows their relative rotation.

For each of these shafts 22, 62, 82, it may be provided that one of the bearings ensures axial locking of the shaft, for example in the form of a ball bearing, while the other of the bearings allows axial displacement of the shaft, for example in the form of a roller bearing, to avoid static overdetermination while controlling the axial position of the shaft.

In this example, the front fan bearing 21 and the inter-shaft bearing 81 are roller bearings, while the fan and rear turbine bearings 23, 83 are ball bearings. In this example, the front compressor bearing 61 is a ball bearing, while the rear compressor bearing is a roller bearing.

It is noted that to further improve the dynamics, in this case by reducing the length of the concerned shafts 22, 62, 82 so that their natural modes intervene at higher speeds possibly out of the operating speed range of the turbojet engine, it is possible to position the ball bearings 23, 61 as close as possible to the inlet casing of the fan 20 and the compressor 60, respectively. For example, it is possible to place said bearings as close to the inlet casing of the fan 20 and the compressor 60, respectively, as allowed by the geometry of these casings.

As illustrated in FIG. 2, the first bearing 41 supporting the reduction shaft 42 may be a bearing called "high-radius" bearing, that is to say, whose radius is relatively close to that of the casing 30 on which it is fixed. In this case, said bearing 41 is arranged radially outside the compressor shaft 62, the turbine shaft 82 and the reduction shaft 42.

It is noted that due to the simplified structure of the turbojet engine 10, a fortiori for a single-spool engine 10, the distance between the bearings supporting the same shaft can be reduced compared to the currently developed more complex architectures. This results in better rotational dynamics of the components of the turbojet engine 10. In general, decreasing the length to diameter ratio of a shaft allows improving the dynamics of the shaft.

In terms of mass, the inventors estimate the mass gain between 5% and 15% for the turbojet engine 10 of the second embodiment, compared to a conventional two-spool turbofan engine with single reduction gear.

Figure 3:
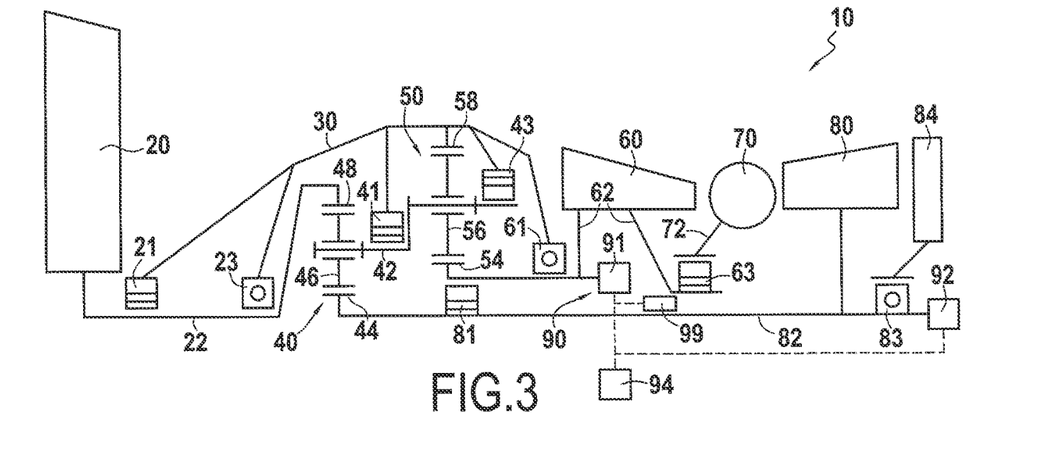
FIG. 3 schematically illustrates an axial half-section of a turbojet engine according to a third embodiment.
Figure 4:
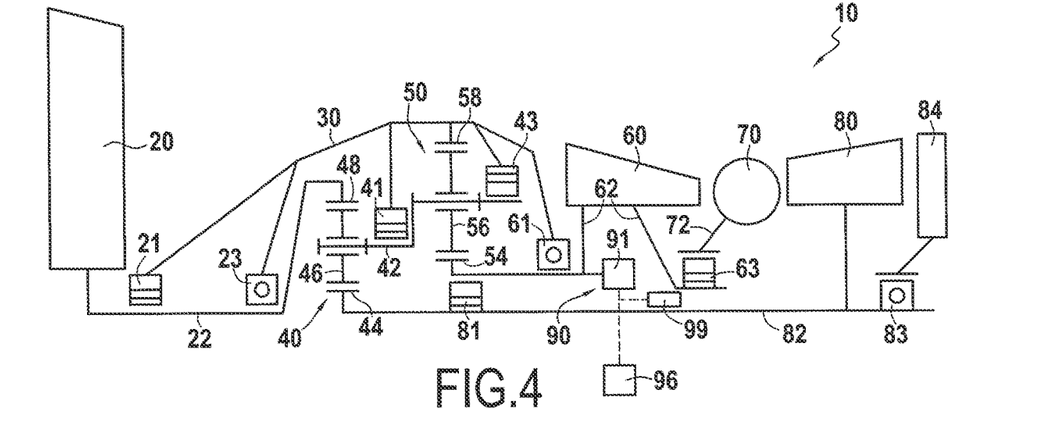
FIG. 4 schematically illustrates an axial half-section of a turbojet engine according to a fourth embodiment.
Figure 5:
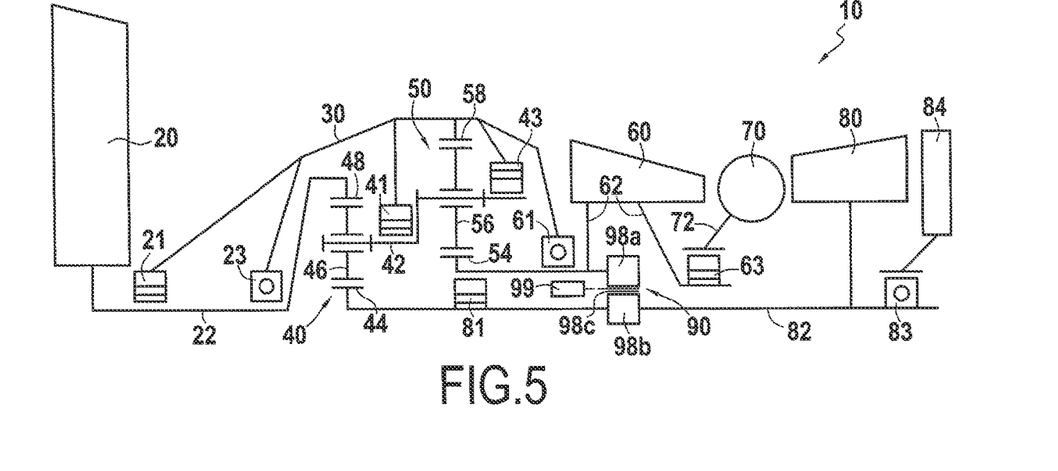
FIG. 5 schematically illustrates an axial half-section of a turbojet engine according to a fifth embodiment.

In the third to fifth embodiments, represented in FIGS. 3 to 5 respectively, in order to reduce the risk that the compressor 60 is at too low speed when the turbine 80 rotates at idle speed or more generally at a non-zero but low speed, there may be provided a power supply device 90 configured to provide additional power to the one provided by the turbine 80 to drive the compressor 60. Of course, such a power supply device may be compatible with the embodiments described above.

The power supply device can be of various kinds. For example, the power supply device 90 may be configured to provide power coming from a source separate from the turbine 80, said power therefore not being provided, directly or indirectly, instantaneously or in a delayed manner, by the turbine 80. Typically, in the third embodiment, the power supply device 90 comprises an electric motor 91 configured to rotatably drive the compressor 60. As illustrated in FIG. 3, the electric motor 91 may be engaged with the compressor shaft 62. The electrical energy of the electric motor 91 may come from an electric generator 92 configured to be driven by the turbine 80, or more specifically by the turbine shaft 82, in this embodiment.

Alternatively or in addition, the power supply device 90 may comprise a connector 94 configured to be connected to a power supply external to the turbojet engine and to provide the electric motor 91 with the necessary electrical energy, on the understanding that the additional power to drive the compressor 60 despite the idle speed of the turbine 80 is useful essentially when the turbojet engine 10 operates at idle speed, on the ground as well as in flight, for example during the descent phase.

Alternatively or in addition, as illustrated in FIG. 4 with reference to the fourth embodiment, the electrical energy intended to power the electric motor 91 may come from electricity storage means 96 electrically connected to the electric motor. Where appropriate, the electricity storage means 96 may be connected to the electric generator 92 or to the connector 94 illustrated in the third embodiment. According to the configuration, the electricity storage means 96 may act as a buffer to accumulate the energy produced by the electric generator 92 independently of its consumption by the electric motor 91.

The electricity storage means 96 may comprise one or more batteries, or any other adapted storage means.

However, it is not necessary for the power provided by the power supply device 90 to switch in electrical form. In the fifth embodiment, represented in FIG. 5, the power supply device 90 comprises a variable mechanical or electromagnetic transmission coupled on the one hand to the shaft 62 of the compressor 60 and on the other hand to the shaft 82 of the turbine 80. More specifically, the power supply device 90 comprises a first engagement element 98a rotatably secured to the compressor shaft 62, a second engagement element 98b rotatably secured to the turbine shaft 82. The first and second engagement elements 98a, 98b may be variably engaged with each other (which includes the possibility of decoupling them), by means of a mechanical or electromagnetic link 98c. For example, the link 98c may be a clutch, a differential system, an electromagnetic coupler or any other variable transmission of mechanical energy.

The third, fourth and fifth embodiments have in common that the power provided to the compressor 60 by the power supply device 90 is variable and can be controlled. For that purpose, there may be provided a control unit 99 configured to control the power supply device 90. For example, the control unit 99 may control the power supply device based on a rotational speed of the turbine 80 or on another parameter representative of the speed of the turbojet engine 10. For example, it may be useful to activate the power supply device 90 when the turbine rotates at a speed less than or equal to 95% of its maximum rated rotational speed, and to deactivate the power supply device 90 for a rotational speed of the turbine greater than 95% of its maximum rated rotational speed. Thus, even when the turbine 80 is in idle mode, the compressor 60 can be maintained in a stable rotational speed offering good operability, that is to say an ability to maintain the stabilized and transient operating points of the turbomachine at a distance sufficiently far from the aerodynamic instability areas.

The power supply device 90 may be dimensioned so that the maximum additional power provided by the power supply device may be greater than 1.5 Megawatts (MW), preferably greater than or equal to 1, 8 MW, more preferably greater than or equal to 2.1 MW.

Although presented to increase the rotational speed of the compressor 60 when the turbine 80 rotates at idle speed, the power supply device 90 can, incidentally, be used as an assistance to the acceleration of the turbojet engine 10, for example during start-up or during rapid transient maneuvers.

Furthermore, the power supply device may be used as part of a two-spool turbofan engine, which comprises, in addition to the aforementioned compressor and turbine which form a high-pressure spool, a low-pressure compressor or booster and a low-pressure turbine, positioned on either side of the high-pressure spool and forming a low-pressure spool. The low-pressure compressor is driven by the low-pressure turbine. For example, the power supply device may be used to provide power to the high-pressure shaft in order to improve the operability of the high-pressure compressor by lowering its operating line, which is conventionally defined as the locus of points described in the compressor in a system of coordinates [compression ratio; reduced mass flow rate], during all the possible conditions of operation of the engine, particularly between full throttle and idle. When the power supply device is used, the supplied power may be taken from the low-pressure shaft, which improves the operability of the low-pressure compressor by lowering its operating line.

Although the present description refers to specific exemplary embodiments, modifications can be made to these examples without departing from the general scope of the invention as defined by the claims. Particularly, individual characteristics of the different illustrated/mentioned embodiments can be combined in additional embodiments. Consequently, the description and the drawings should be considered in an illustrative rather than a restrictive sense.

The invention claimed is:

1. A turbojet engine comprising:
a fan,
a compressor,
a combustion chamber and
a turbine configured to rotatably drive the fan via a first reduction gear and the compressor via a second reduction gear,
wherein the first reduction gear is rotatably coupled to i) the turbine via a turbine shaft, ii) the fan via a fan shaft and iii) the second reduction gear via a reduction shaft and wherein the second reduction gear is coupled to the compressor via a compressor shaft such that the compressor shaft is rotationally coupled to the turbine shaft via the first reduction gear, the reduction shaft and the second reduction gear;
the reduction shaft being supported by a bearing arranged between the first reduction gear and the second reduction gear.

2. The turbojet engine according to claim 1, wherein the bearing is a roller bearing.

3. The turbojet engine according to claim 1, wherein the turbojet engine is a turbofan engine comprising a casing disposed downstream of the fan and separating a primary flowpath from a secondary flowpath, and the bearing is supported by said casing.

4. The turbojet engine according to claim 3, further comprising a fan bearing arranged between the fan shaft and the casing.

5. The turbojet engine according to claim 3, comprising a compressor bearing arranged between the compressor shaft and the casing.

6. The turbojet engine according to claim 1, comprising a second bearing arranged to support the reduction shaft.

7. The turbojet engine according to claim 1, comprising an inter-shaft bearing arranged between the compressor shaft and the turbine shaft.

8. The turbojet engine according to claim 1, wherein said bearing is arranged radially outside the compressor shaft, the turbine shaft and the reduction shaft.

9. The turbojet engine according to claim 1, comprising a compressor bearing arranged between the compressor shaft and a structural member downstream of the compressor.

10. The turbojet engine according to claim 1, wherein the reduction shaft is a planet carrier common to the first reduction gear and to the second reduction gear.

11. The turbojet engine according to claim 6, wherein the second bearing is a roller bearing.

* * * * *